United States Patent [19]

Southerland et al.

[11] 4,335,555
[45] Jun. 22, 1982

[54] RAFTER ASSEMBLY AND FIXTURES

[75] Inventors: Robert Southerland, Rt. 190 2 Box 96, Muldrow, Okla. 74948; James Canition, St. Smith, Okla.

[73] Assignee: Robert D. Southerland, Muldrow, Okla.

[21] Appl. No.: 128,379

[22] Filed: Mar. 10, 1980

[51] Int. Cl.³ ........................... E04B 1/48; E04B 7/06
[52] U.S. Cl. ..................................... 52/639; 52/665; 52/713; 403/190
[58] Field of Search .................... 52/92, 94, 665, 648, 52/280, 639–643, 655, 713, 712; 403/169, 170, 190, 205, 4, 237, 403

[56] References Cited

U.S. PATENT DOCUMENTS

| 962,528 | 6/1910 | Rockwell | 403/190 |
|---|---|---|---|
| 2,611,160 | 9/1952 | Hanesse | 182/228 |
| 3,333,875 | 1/1967 | Tracy | 403/170 |
| 3,423,898 | 1/1969 | Tracy et al. | 52/665 |

*Primary Examiner*—James L. Ridgill, Jr.
*Attorney, Agent, or Firm*—Robert R. Keegan

[57] ABSTRACT

There is disclosed a system of fixtures for use with standard dimension lumber for constructing pitched roofs for residential or commercial wood frame structures including gabled roofs, hip roofs and more complex roof structures. One form of sheet metal fixture takes the uncut ends of a pair of two inch (nominal) thickness lengths of lumber and is so shaped that the two lengths of lumber are joined with the fixture and common nails at a selected angle corresponding to the desired angle between rafters at the peak of a gabled roof. Other disclosed fixtures are shaped to join a hip rafter with one or more common rafters or jack rafters. Similar fixtures are used to join valley rafters with jack rafters. Further plate fixtures secure the lower ends of rafters to the plate on top of the exterior wall frame without the necessity for an angle cut or bird's mouth cut in the rafter. The fixtures are shaped of sheet metal to join respective rafters at the proper simple angle or compound angle for a predetermined roof pitch; some fixtures such as the common rafter peak fixture are adjustable for several different pitches by slight bending of the top portion of the sheet metal fixture.

15 Claims, 15 Drawing Figures

RAFTER ASSEMBLY AND FIXTURES

This invention relates to construction of pitched roofs from standard dimension lumber in residential and other structures. According to the invention such construction is accomplished using metal fixtures which serve as fastenings between the wooden elements and at the same time guide the workman in proper assembly of the structure. The necessity for making simple angle and compound angle cuts is largely eliminated. Considerable skill is required in laying out the cuts conventionally required in assembling a pitched roof, but such skill is not required when utilizing the system of the present invention with the fixtures according to the invention in assembling a pitched roof such as a gabled roof, a hip roof or other conventional pitched roof forms.

In accordance with the present invention erection of the roof structure is also simplified so that it is readily accomplished by two persons and can for the most part even be managed by one person. The system of the invention does not, however, employ roof trusses manufactured off-site as are frequently employed in non-residential construction and occasionally in residential construction. Such trusses are ill-suited to anything but a straight gabled roof. Trusses also tend to be standardized in span and in pitch and do not have the flexibility desired for residential structure design.

Conventional roof construction generally proceeds from a point at which all of the walls of the structure are erected and the structural members for the ceiling called "ceiling joists" are in place. See *Constructing and Manufacturing Wood Products*, by Wayne H. Zook, published by McKnight Publishing Company of Bloomington, Ill., 1973, pages 405 to 409.

Ceiling joists will typically be two by sixes placed on 16 inch centers and spanning the narrow width of the structure. Splices in joists are preferably arranged to coincide with internal load bearing walls. Joists will occasionally be placed on 24 inch centers (sometimes with a compensating increase in depth of the joists). Rafters are preferably on 24 inch centers so that this spacing of joists permits fastening the ends of the rafters adjacent to a corresponding joist in every case. For ease of illustration and explanation the roof construction described herein is with reference to rafters and joists both on 24 inch centers, although it will be understood that either or both could be on 16 inch centers if desired.

The advantages of the present system will be better understood from a brief discussion of procedures required in conventional roof construction. While a mathematician might approach the construction of a roof by calculating various angles in degrees through the use of solid trigonometry, this is hardly practical for a carpenter, even a very proficient one. Carpentry procedures have been worked out using roof slopes expressed as inches of rise per 12 inches of run. Thus a roof with a rise of four inches for every 12 inches of run is termed a 4/12 pitch roof (or sometimes a ⅓ pitch). Other pitches are employed such as 5/12, 6/12, etc. The inches of rise are always referred to 12 inches of run and fractional inches of rise are avoided.

Layout of rafters is accomplished with a rafter square which is essentially a carpenters framing square of 16×24 inches which commonly has a rafter table printed or embossed on it. The first line in the rafter table characteristically gives the length of the rafter for each foot of run for a roof of a prescribed pitch. For example, under 5 on the blade of the rafter square in the first line of the table is the number 13. For example, a building 24 feet wide would have a 12 foot run and 13 inches multiplied by 12 gives 13 feet which would be the length of a rafter from the roof peak to the plate. In conventional construction rafters are notched with a "bird's mouth" which fits on top of the plate and facilitates nailing through the rafter into the plate. The rafter square is used to lay out the bird's mouth at the proper angle. Conventional roof construction also has a ridge board and the top end of the rafter needs to be angle cut with the aid of the rafter square for a proper fit against the ridge board (allowance for half the thickness of the ridge board must be made in determining the distance from the top of the rafter to the bird's mouth). Measurements on the rafter should be made on a line parallel to the edge of the rafter running through the apex of the bird's mouth angle notch. Often the rafter is left with a "tail" which provides an overhang for the roof. The rafter tail may be "plumb cut" at an angle also using the rafter square.

Obviously when a hip roof is involved additional complications arise in conventional roof construction. The hip rafters which run from the corner of the structure to the peak of the roof are longer than common rafters. This is commonly calculated by using a pitch triangle with the run figure being 17 instead of 12 (17 is very nearly the square root of two [1.414] times twelve and thus equal to the distance projected on a horizontal plane from the end of the roof peak to the corner of a twenty-four foot wide structure). The center rafter in the hip roof is normally caused to be of the same length and pitch as a common rafter, i.e. the slope of the hip portion of the roof is made the same as the gable portion by giving it a run equal to that of the gable portion. The other rafters in the hip are referred to as "jack rafters", and while they have the same pitch as common rafters they are shorter and also must be cheek cut on top to fit the hip rafter; that is, a compound angle is required in the top of the jack rafters in conventional construction. Tables printed on the rafter square aid the carpenter in making the rafters of the necessary length and cutting them at the proper angles. Considerable expertise in use of the rafter tables is required however. Gable roofs with valleys generally present the same situation since a valley rafter is essentially the same as a hip rafter except that it makes an acute angle with the roof peak whereas the hip rafters make an obtuse angle with the roof peak.

The system according to the present invention utilizes sheet metal fixtures for joining wood frame members which are cut and bent to shape to provide the proper angles for joining common rafters together, joining hip or valley rafters to common rafters and for joining jack rafters to hip rafters or valley rafters. The wood frame member is joined to another by inserting it in the metal fixture without cutting and by nailing or otherwise fastening through the metal fixture into the wood frame member. Virtually all accurate measuring of angles and accurate cutting on the part of the carpenter is eliminated. Intimate knowledge of conventional roof construction involving use of rafter tables, etc., is not required for the workman. Essentially no skills beyond rough cutting and use of hammer and nails are required utilizing the roof assembly fixtures according to the present system. At the same time the roof constructed according to the present invention has strength at least equal to roofs constructed with conventional carpentry techniques and has a desirable uniformity often not achieved with conventional carpentry.

In accordance with the invention approximately one-half dozen different types of sheet metal fixtures are provided for joining the structural members of a pitched roof. In general the arrangement of the wood structural members is the same as employed in conventional roof structures with the exception that a ridge pole or ridge member is not required in the structures of the present invention and is generally not used. It will be understood that the roof construction and finishing such as application of plywood sheathing, roofing, eave treatment, facia and gutter construction will be accomplished in a conventional manner and accordingly is not described in detail herein.

Roofs constructed according to the invention may be common gable roofs (saddle roofs), hip roofs, dormered roofs or most commonly encountered roof variations. According to the invention a relatively small number of types of standarized sheet metal fastening fixtures are used to secure the roof members together in conjunction with common nails or other fasteners.

In accordance with the invention wood-to-wood joints secured by common nails only are not generally relied upon, and consequently most of the roof members can simply be cut to an approximate length with no further cutting required. Any individual cutting does not require accurate measurement of difficult angle cuts or compound angle cuts.

The angle at which the wood roof members are joined to one another is essentially predetermined by the fastening fixture so that no calculation or angle determination is required by the workman. In some cases the sheet metal fastening fixture is adjustable and provided with calibration marks so that the same fixtures can be used to construct gables of different pitches such as 4/12, 5/12, 6/12, etc.

Conventional roof construction techniques not only require accurate cutting of simple and compound angles, but also require that the roof members be nailed together by "toe nailing" with nails of appropriate size so that a rather high level of carpentry skill is required in the nailing operation as well as the cutting operation. In contrast, in the construction of a roof according to the present invention the joints are typically wood-to-metal-to-wood joints and thus the nailing is done through sheet metal into wood in a straightforward fashion requiring little carpentry skill and presents no problem in determining the positioning and size of nails to be used.

The fixtures and roof assembly according to the present invention also eliminate the necessity for a ridge board and this substantially reduces the skill and effort required in erecting the roof structure. In the roof assembly of the invention the matching rafters are joined at the ridge point with a sheet metal fixture which securely connects the two rafters together at the proper angle for the roof pitch designated for the roof. The pairs of rafters may be joined on the ground and raised to the roof very easily by two persons and even one person in many situations. Other fixtures secure the rafters to the wall plate member. For hip roofs and other more complicated structures appropriate fixtures secure hip rafters, valley rafters, jack rafters, etc., in position.

The use of sheet metal fixtures to facilitate or implement the joining of wood structural members is of course well known. For example, structural wood fasteners are manufactured by TECO Products and Testing Corp., including joist hangers, framing anchors, post anchor braces, truss plates, backup clips, door shims, plywood supports, floor bridging, and others. However, sheet metal fastening fixtures for wood structural members are not known to have been devised to implement a roof and rafter system as in the present invention.

In addition to providing the features and advantages described above, it is an object of the present invention to provide a pitched roof construction utilizing specially adapted fixtures of sheet metal in which the top ends of pairs of rafters are fitted and secured with the proper angular relationship for a roof of a desired pitch.

It is another object of the present invention to provide fixtures usable in the construction of such a roof wherein one type of fixture may be used for different roof pitches by bending it to bring together marks placed on the fixture for calibration thereof.

It is still another object of the present invention to provide a system of roof construction wherein sheet metal fastening fixtures are provided for joining pairs of rafters at the peak of the roof and additional fixtures serve to secure the rafters to the wall plate and to secure joist members extending from the lower end of one rafter to the lower end of a matching rafter.

It is yet another object of the present invention to provide fixtures for roof structure adapted to receive a hip rafter and secure the end thereof in proper angular relation to a common rafter of the roof.

It is a still further object of the present invention to provide a fixture for a roof structure according to the invention adapted to receive and secure the end of a jack rafter and position and secure it in place in proper position relative to a hip rafter or a valley rafter.

Other objects and advantages of the invention will be apparent from consideration of the following description in conjunction with the appended drawings in which.

Figure 1:
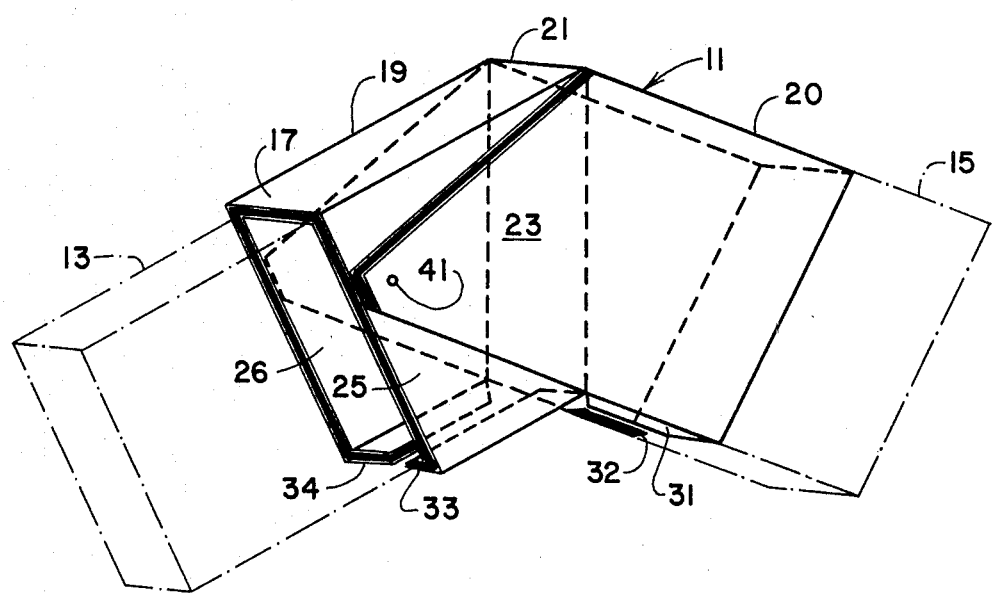
FIG. 1 is an isometric view of a common rafter joining fixture according to the present invention.
Figure 2:
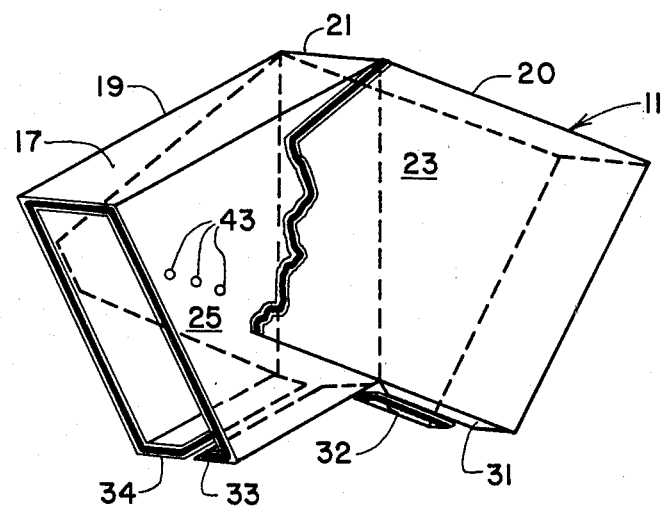
FIG. 2 is an isometric view of the device of FIG. 1 broken away to show the adjustable angle feature of the device.
Figure 11:
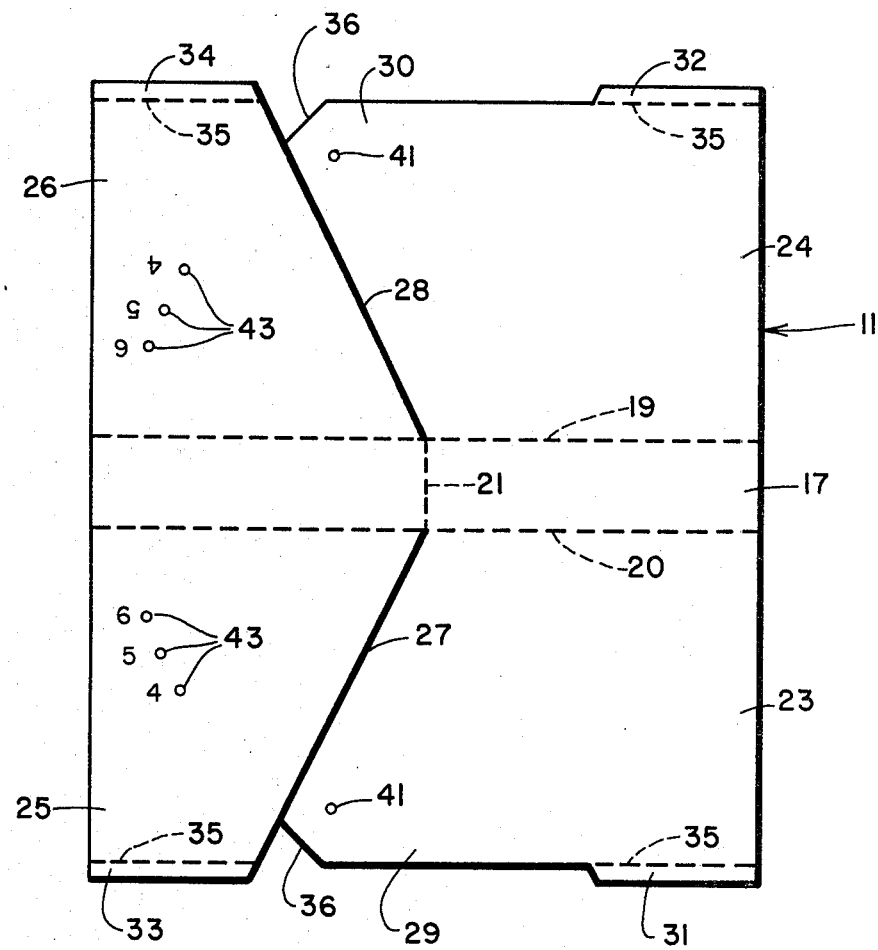
FIG. 11 is a developed view of the device of FIG. 1.
Figure 12:
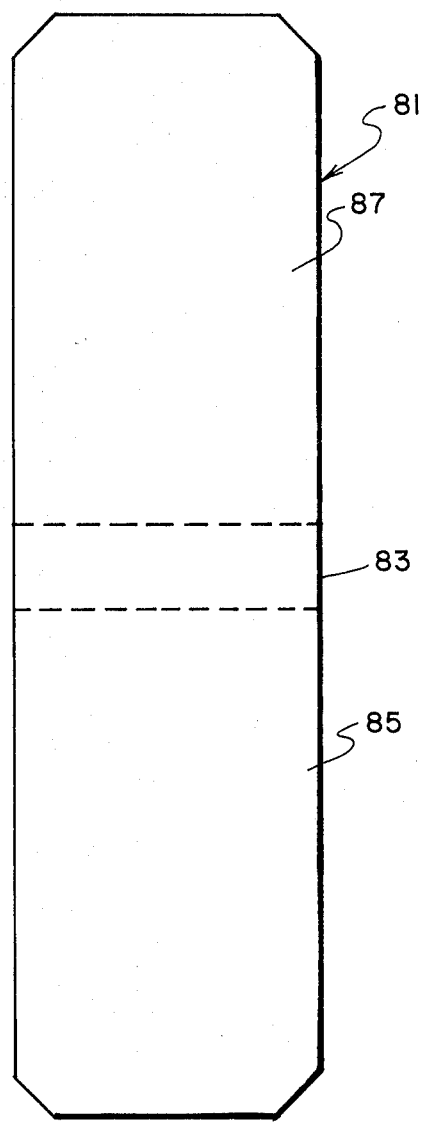
FIG. 12 is a developed view of the device of FIG. 4.

Referring now to the drawings, FIG. 1 and FIG. 2 show a common rafter joining fixture as used in accordance with the invention. FIG. 1 shows the placement of the rafter ends in the fixture and FIG. 2 shows the fixture broken away to better illustrate the adjustable pitch feature it incorporates. It will also be useful to refer to FIG. 11 together with FIGS. 1 and 2 as FIG. 11 shows a developed view of the common rafter joining fixture of FIGS. 1 and 2; in other words, FIG. 11 shows the way in which a piece of sheet metal would be cut and bent to form the fixture of FIGS. 1 and 2.

As seen in FIG. 1 a pair of rafters 13 and 15 have their ends inserted in common rafter joining fixture 11 in a manner causing them to be secured together at a predetermined angle appropriate for rafters in a gable of a selected pitch.

A portion of the sheet metal of fixture 11 forms a strap 17 approximately 1½ inches wide over the top of the rafters 13 and 15 (a two by four or two by six is about 1½ inches thick). The strap 17 is defined by bend lines 19 and 20 which are indicated as broken lines in FIG. 11. Near the center of strap 17 is a transverse bend line 21. The bends on lines 19 and 20 will be approximately right angle bends but the bend on line 20 is generally a lesser bend determined by the angle formed by the rafters at the peak of the roof.

Bent down from strap 17 is a pair of large flaps 23 and 24 and a pair of smaller flaps 25 and 26. Flaps 23 and 25 are separated by cut line 27 and flaps 24 and 26 are separated by cut line 28. As will be seen from FIGS. 1 and 2 large flaps 23 and 24 overlap smaller flaps 25 and 26 respectively, when strap 17 is bent along line 21 (flaps 23–26 have already been bent downward at a right angle to strap 17). As illustrated, flaps 23 and 24 are overlapped on top of flaps 25 and 26 but alternatively flaps 23 and 24 could go under flaps 25 and 26. The fixture 11 is provided with flanges 31, 32, 33 and 34 which are bent at a right angle from flaps 23, 24, 25 and 26 along bend lines indicated at 35 in FIG. 11. Flanges 31–34 are located relative to bend lines 19 and 20 by a distance slightly greater than the width of the rafter for which the fixture is intended, for example 5¾ inches for a two by six rafter. Flanges 31 make the structure of the fixture more rigid and aid in locating and holding the rafter while it is being fastened to the fixture. Flanges 31–34 are not essential however, and they may be omitted. If flanges 31–34 are omitted the fixture may be adapted to be used with rafters of different widths, for example two by sixes or two by eights. As shown in FIGS. 1, 2 and 11, the ends 36 of flaps 23 and 24 are cut at an angle so that they do not extend beyond the edge of flaps 25 and 26 (see FIG. 1). This feature is largely a matter of appearance and is not necessary to the operation of the device.

Once rafter 13 has been put in place between flaps 25 and 26 it is secured in place by nailing through hole 41 and one of the holes 43. It will be noted that holes 43 are three in number on each of flaps 25 and 26 and are marked with numerals 4, 5, and 6. When hole 41 coincides with hole 43 marked with the numeral 4 the bend at bend line 21 is at an angle proper to determine the peak angle for a gable with a 4/12 pitch. Similarly when hole 41 coincides with hole 43 marked with the numeral 5 the angle at bend line 21 is proper for a 5/12 pitch. This is arranged by causing the angle from the intersection of bend line 21 and bend line 20 from hole 41 to the hole 43 marked 4 to be 37 degrees; the angle to the hole marked 5 is 45 degrees and the angle to the hole marked 6 is 53 degrees. The fixture 11 is accordingly readily adjustable for the more common roof pitches, 4/12, 5/12, and 6/12. Clearly holes 43 could be provided for other roof pitches utilizing the same approach illustrated in FIG. 11 and described above.

The purpose for the cut line 27 and the cut line 28 being slanted is to cause the hole 41 as shown in FIG. 1 to extend to a point near the edge of flap 25 thereby permitting the nail driven in hole 41 to be well secured in rafter 13 at a sufficient distance from the end thereof to minimize the likelihood of splitting. The angle of cut shown in FIG. 11 is appropriate for pitches up to 6/12 or 7/12 without encountering interference between flap 23 and strap 17. If greater pitches are desired cut line 27 could be made perpendicular to bend line 20 or the end of flap 23 could be cut off to leave a notch between flap 23 and flap 25 in the developed view of FIG. 11. In general however, the configuration as shown will accommodate the great majority of situations in residential construction.

It is contemplated that the common rafter joining fixture 11 will be provided to the carpenter already formed into the shape indicated in FIG. 2 so that no bending of the metal fixture would be required beyond the slight bend on bend line 21 necessary to adjust the fixture to the desired pitch and match hole 41 with one of the holes 43. Other holes for nailing will be provided in fixture 11 or indentation or marks may be provided as a guide to location of nails. This is not an essential feature however as common nails may readily be driven through the sheet material into the rafter. The sheet metal of which the fixture is formed is not required to be of a particular thickness but sheet metal of 22 gauge has been found to be very suitable. Thickness from about 0.02 to about 0.05 inches may also be used. Very thick metal is not required because the box shape of the fixture lends substantial strength to the structure. Furthermore, when the rafter ends are nailed into the fixture the rafter lends strength to the fixture structure. Within the fixture the rafters 13 and 15 preferably meet so the truss-like structure gains support from the wood-to-wood contact as well as to wood-to-metal-to-wood fastening. The preferred embodiment of the fixtures are formed of galvanized steel sheet but other sheet metal may be used. Steel with a protective coating other than galvanizing may be used or metals other than steel such as aluminum may be used if desired.

In some cases certain of the bends in the fixture may be left to be made or completed by the carpenter, for example, flanges 31–34 may be left unbent and bent over by the carpenter after rafters 13 and 15 are inserted into the fixture. Also to facilitate packing and shipment it may be desired to leave the fixture unbent at bend line 21 and to leave the bends along lines 19 and 20 incomplete so that the angle between strap 17 and each of the flaps 23–26 is slightly more than 90 degrees. This will permit the fixtures to nest one on top of the other and occupy substantially less space in shipment. At the same time the carpenter will have no difficulty in making the bend along line 21 to the desired angle and completing the bends on lines 19 and 20 to form a right angle.

Figure 3:
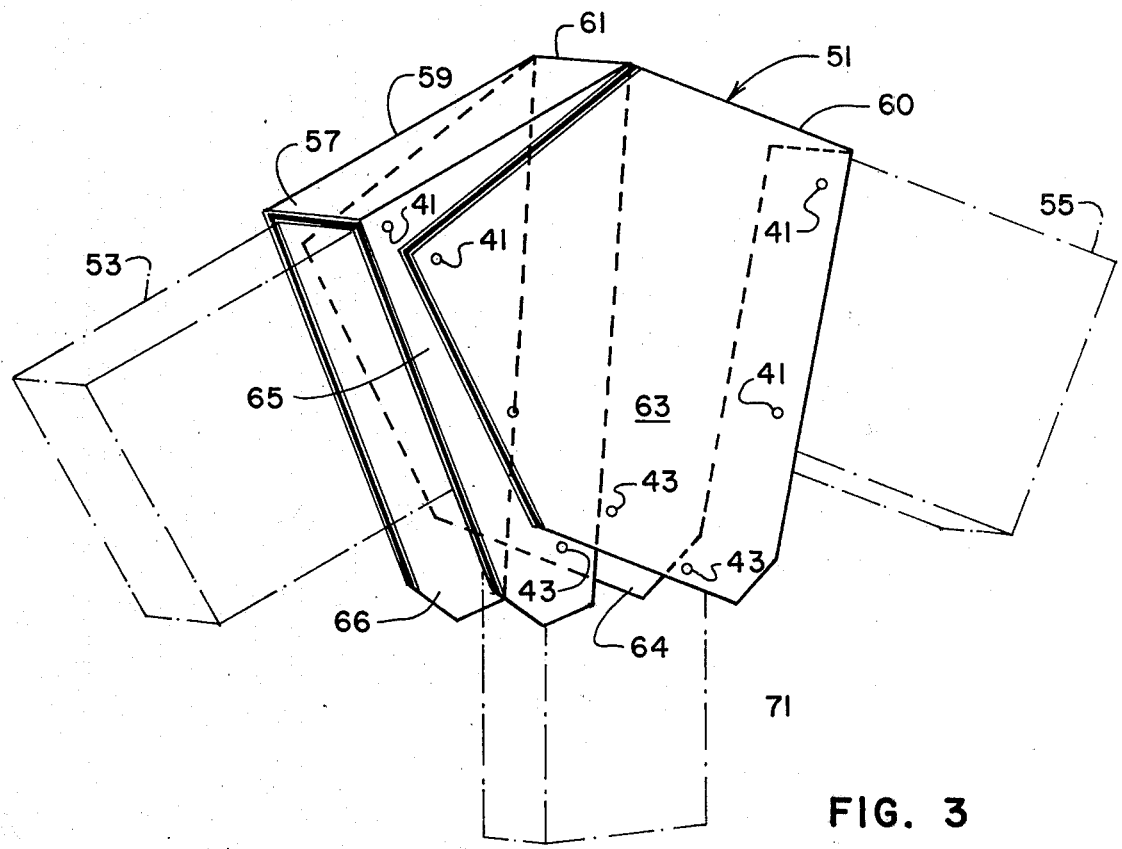
FIG. 3 is an isometric view of an end rafter fixture according to the invention.

FIG. 3 shows an end rafter joining fixture 51 joining rafters 53 and 55. Rafters 53 and 55 are end rafters, namely those which are in vertical alignment with the end wall of the structure. Fixture 51 includes strap portion 57 defined by bend lines 59 and 60, and is similar in this respect to fixture 11 as shown in FIG. 11. The strap 57 is bent along a bend line 61 also in a fashion similar to that of fixture 11.

Fixture 51 is provided with flaps 63, 64, 65 and 66 which are generally comparable to flaps 23, 24, 25, and 26 of fixture 11 except that they extend a substantial distance below rafters 53 and 55 and are not provided with flanges such as 31–34. The downward extension of flaps 63–66 permits fixture 51 to be used to attach an upright support 71 to the pair of rafters 53 and 55. After rafters 53 and 55 have been secured into fixture 51 using nails 41 in substantially the same manner as described with respect to fixture 11 (in FIGS. 1, 2 and 11), an upright 71 which will normally be a two by four or a two by six will be inserted between the ends of flaps 63 and 65 and 64 and 66; it then may be nailed into position by nailing through flaps 63–66 with nails 43 as shown in FIG. 3.

The nails used with this and other fixtures may be of various types. For example, ordinary common nails longer than two inches may be used and driven completely through the rafter or upright and both sides of the fixture after which the extending ends may be bent over to secure the nail more firmly in accordance with common practice. Alternatively shorter, heavier nails such as roofing nails slightly less than two inches in length may be used in which cse they will penetrate only one side of the fixture and the rafter or upright. Such nails commonly have grooves or rings to increase their holding power in wood. In fact virtually any form of fastener suitable for fastening sheet metal to wood may be utilized with the fixture according to the invention because there is no significant strain on the fastener tending to withdraw it from the wood; thus any sort of fastener ranging from power driven staples or nails to wood screws may be utilized.

Both the fixture 11 of FIGS. 1, 2 and 11 and the fixture 51 of FIG. 3 are subject to variation in the way that the sheet metal is layed out. As previously mentioned flanges 31–34 may be made larger or omitted in whole or in part. Also the flaps 23–26 and 63–66 are shown with an asymmetrical orientation. That is, viewed from one side the larger flap is on the right while viewed from the opposite side the larger flap is on the left. The bend line 21 is in the center of the fixture however, and it may be seen that the flap configuration on one side of the fixture may be reversed so that the fixture would be symetrical. The symetrical arrangement would place the holes 43 on opposite ends of the fixture so that nails driven through holes 43 would go into each of the rafter ends rather than into only one rafter end as illustrated in FIGS. 1, 2, and 3.

Fixture 51 is primarily useful in connecting an upright support below end common rafters at the end of a gable. However, upright supports may be included for middle rafters as well as end rafters in which case the upright would extend from a joist or an interior wall.

Figure 4:
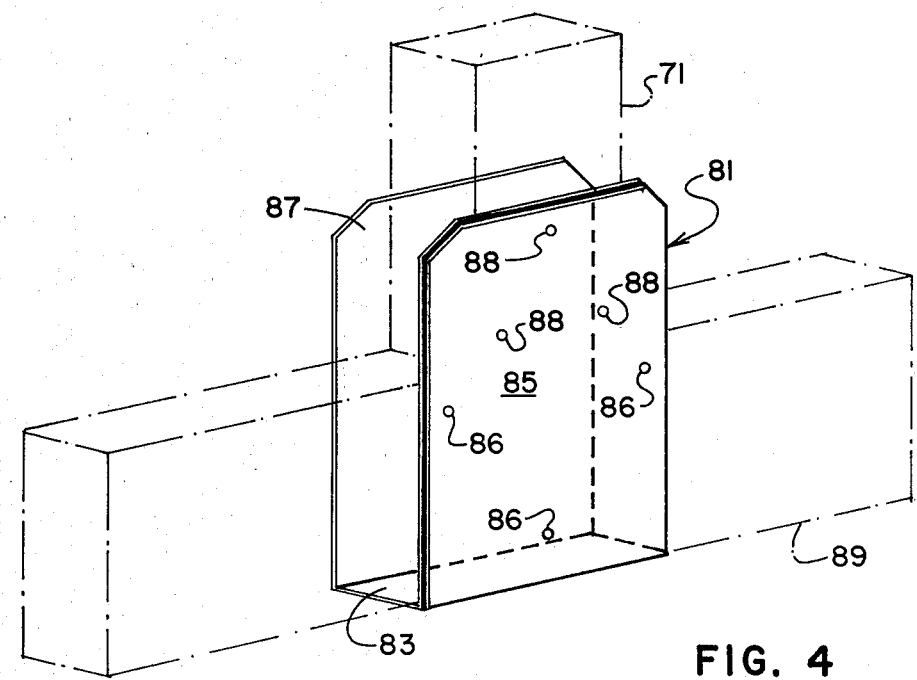
FIG. 4 is an isometric view of a vertical post or king post fixture according to the invention.
Figure 13:
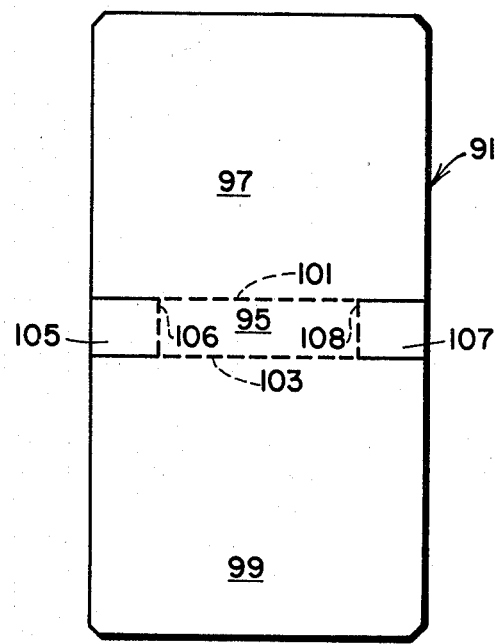
FIG. 13 is a developed view of the device of FIG. 5.

FIG. 4 shows an upright to joist joining fixture 81 consisting of a strap 83 and two simple flaps 85 and 87. A joist 89 fits between flap 85 and flap 87 which are separated by the thickness of the joist. Nails 86 secure joist 89 to fixture 81 and nails 88 secure upright 71 to the fixture 81 with the bottom end of upright 71 in contact with the top edge of joist 89. Fixture 81 will be secured first to joist 89 after which upright 71 is secured in place. It is a matter of choice whether fixture 81 be installed before or after the installation of upright 71 in fixture 51. The developed view of fixture 81 is quite simple and is shown in FIG. 13.

Figure 5:
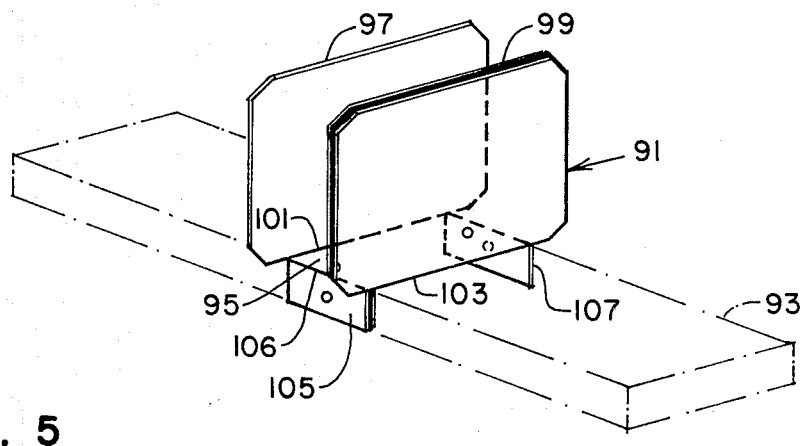
FIG. 5 is an isometric view of a plate fixture according to the invention.
Figure 14:
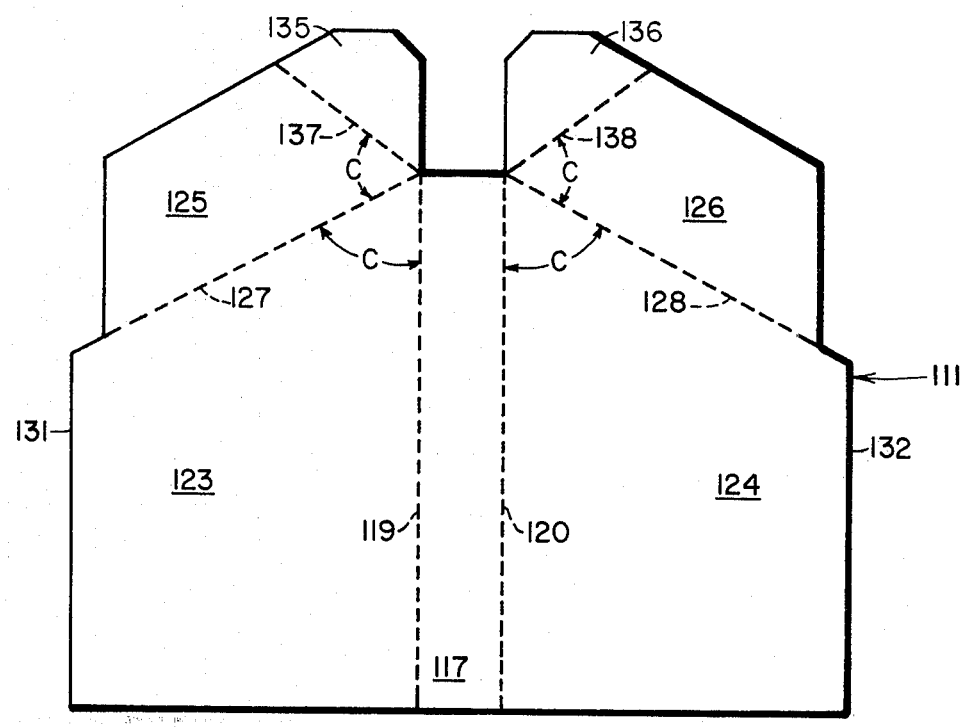
FIG. 14 is a developed view of the device of FIG. 6.

FIG. 5 shows a rafter-to-plate joining fixture 91 in an isometric view while FIG. 14 is a developed view of the fixture 91. Fixtures 91 are normally utilized to secure a rafter to the plate at the top of an exterior wall and eliminate the necessity for making a bird's mouth cut in each rafter and toe-nailing it to the plate as was the practice in conventional roof construction. Fixtures 91 may also be utilized to secure ceiling joists to plates of interior or exterior walls.

In some roof designs the rafter will have a tail which extends as much as several feet beyond the plate and which forms an overhang on the roof. In other cases the rafter will terminate at or near the plate atop the exterior wall. For convenience the latter design will be used for illustration although it will be understood that fixtures 91 and other components of the system may equally well be utilized with rafters with extending tails to form overhanging roofs.

Fixture 91 is shown in FIG. 5 secured to the top of a plate 93 which surmounts the top of an exterior wall (not shown). Fixture 91 includes a strap 95 from which extend two flaps 97 and 99 which are joined to strap 95 along bend lines 101 and 103.

Bent down from strap 95 are flanges 105 and 107 which are bent along bend ines 106 and 108 respectively. The corners of flaps 97 and 99 may be cut off as shown in FIG. 5 to eliminate the sharp sheet metal points at the corners of the flaps.

In FIG. 5 plate 93 is a two by six which would be utilized for a six inch interior wall. Fixture 91 is dimensioned accordingly. The fixture 91 could alternatively be dimensioned to fit a two by four plate utilized on a four inch exterior wall.

The use of the fixture 91 is essentially self-evident; once it has been properly located on top of plate 93 and nailed in position a rafter is inserted between flaps 97 and 99 which are spaced by the thickness of the rafter. The rafter rests on plate 93 and may or may not extend beyond plate 93. The slope or pitch of the rafter is not limited by the fixture 91 and virtually any pitch rafter or even a ceiling joist may be secured in fixture 91. As previously described the rafter is secured in fixture 91 by nailing through at least one of the flaps 97 and 99 into the wood rafter. Holes or indentations may be marked in the flaps 97 and 99 for guidance in locating nails. While flaps 97 and 99 are shown to extend beyond the edges of plate 93 on both inside and outside, the fixture 91 may be modified so that flaps 97 and 99 do not extend beyond the edge of plate 93 on either one or both sides of plate 93.

Figure 6:
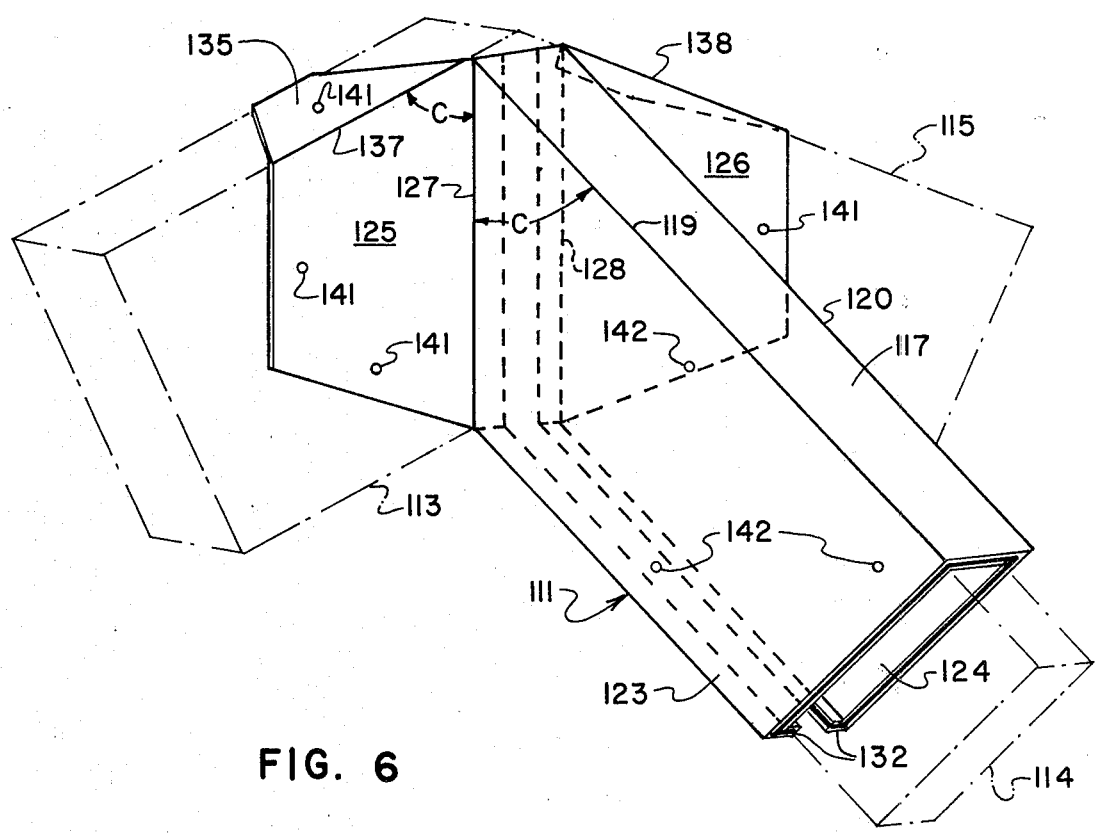
FIG. 6 is an isometric view of a center hip rafter fixture according to the invention.

A center hip rafter fixture 111 is shown in FIG. 6. The developed view thereof is shown in FIG. 14. Center hip rafter fixture 111 is used to join the top end of a center hip rafter 114 to the end pair of common rafters 113, 115 in a hip roof.

The common rafters are shown in phantom lines in FIG. 6 and it will be understood that they are joined by a common rafter fixture 11 although the common rafter fixture 11 is not shown in FIG. 6 in order not to unduly complicate the drawing. Fixture 111 incudes a strap 117 which connects a flap 123 and a flap 124. Flaps 123 and 124 are bent at a right angle to strap 117 along bend lines 119 and 120, respectively.

Flaps 123 and 124 together with strap 117 are accordingly shaped to accept the end of a rafter such as a two by six. Further flaps 125 and 125 are bend from an end of flaps 123 and 124 along bend lines 127 and 128.

The angle C between bend line 127 and bend line 119 (which is the same as the angle between bend line 128 and bend line 120) is determined by the pitch of the roof for which fixture 111 is designed. Fixture 111 is not adjustable as was the case with common rafter fixture 11. The angle between the surface of flap 123 and the surface of flap 125 and the angle between the surface of flap 124 and the surface of flap 126 will be 90 degrees in all cases for this particular fixture. As will be seen from FIG. 6 the angle between bend line 119 and bend line 127 is equal to the angle between the center hip rafter 114 and the vertical. For a 5/12 pitch roof this angle would be 67.38 degrees and is in general the arc cotangent of the pitch ratio.

As is well known the conventional roof design is simplified by arranging that the hip rafters have the same pitch or slope as the common rafter. This is accomplished by setting the last pair of common rafters a distance from the exterior end wall equal to the run of a common rafter; it is assumed that this design criterion will be followed unless otherwise mentioned.

Flap 125 is provided with a flange 135 bent therefrom along a bend line 137. Similarily flap 126 is provided with a flange 136 bent therefrom along a bend line 138 (see FIG. 14). The angle C between bend line 127 and bend line 137 normally will be the same as the angle C between bend line 119 and bend line 127 since the angle between the common rafter and the vertical is the same as the angle between the center hip rafter and the vertical. In rare instances it might be desired to provide fixtures for roofs where the common rafter pitch and the center hip rafter pitch were not the same. This can be accomplished by determining the angle between bend line 119 and bend line 127 and the angle between bend line 137 and bend line 127 appropriately for the two different pitches. Such custom design of fixtures would not be the usual procedure.

Fixture 111 may be provided with guide holes or indentations for the placement of nails 141 used to fasten fixture 111 to rafters 113 and 115. If such indentations or holes are provided as guides their location will be coordinated with the location of similar guides in the common rafter fixture 111 to avoid interference between the nails or other fasteners; it will be understood that at least some of the nails used to secure fixture 111 will pass through fixture 111 and also through common rafter fixture 11 used to join rafters 113 and 115. Also as will later be described a corner hip rafter fixture will generally be used to join corner hip rafters into the junction between the hip rafter and the common rafters and in some cases fasteners may pass through three thicknesses of sheet metal in the last stage of assembly of the structure. Guide holes 142 are shown in flap 123 for the placement of nails to secure the hip rafter in position. Center rafter 114 is preferably inserted entirely into the opening defined by flaps 123, 124 and the strap 117 until its bottom corner abuts common rafters 113 and 115. Flanges 131 and 132 are provided on flaps 123 and 124 to further rigidify the structure and locate the rafter 114 in the fixture; as in previously described fixtures the flanges 131 and 132 may be omitted with the result that rafters of different width may be used in the same fixture.

Figure 7:
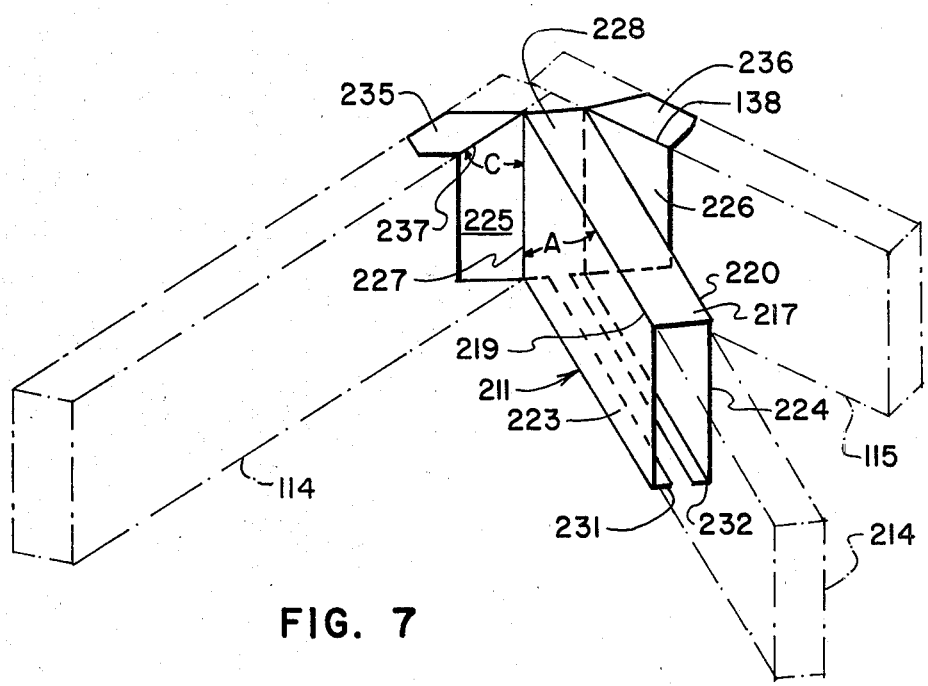
FIG. 7 is an isometric view of a corner hip rafter fixture according to the invention.

A hip corner fixture 211 is shown in FIG. 7. It is apparent that the hip corner fixture 211 bears a great similarity to hip center fixture 111 but it should be pointed out that it has an important difference which relates to the basic principles of rafter assembly. There are a number of terms used for rafters such as "common rafters", "jack rafters", "hip rafters", and "valley rafters", but there are basically two types of rafters, those which run at a right angle to the wall of the structure and those which run at an oblique angle to the wall of the structure. Roof construction and rafter assembly is greatly simplified if all pitches in one roof are the same and the oblique angle rafters thereby turn out to be all at 45 degree angles. The standard fixtures illustrated and described herein all make the assumption that the pitch for all portions of the roof will be the same. (This does not preclude the possibility of a shed dormer which obviously must have a different pitch roof than the main roof structure.)

In order to have a consistent terminology the discussion hereinafter will use the term "common rafter" to include both full rafters and jack rafters which run at right angles to the walls of the structure. The term "angle rafters" will be utilized to refer to hip rafters and valley rafters which both run at 45 degree angles to the walls of the structure.

The angle which common rafters make with the vertical is determined by the pitch ratio. As previously seen a pitch ratio of 5/12 gives an angle of 67.38 degrees to the vertical. The angle to the vertical for any pitch ratio can be obtained by finding the angle which has a cotangent equal to the decimal equivalent of the pitch ratio fraction.

An angle rafter makes a different angle with the vertical than does a common rafter for the same roof. This is due to the fact that the run for an angle rafter is greater by a factor of the square root of two (1.414) while the rise is the same. The run of an angle rafter is very nearly 17/12 times the run for a corresponding common rafter. The length of an angle rafter will also be 17/12 times the length of a corresponding common rafter. The angle to the vertical of an angle rafter may be determined by dividing the pitch ratio fraction by the square root of two (1.414) and finding the angle having a cotangent equal to that number. This angle will be referred to as the angle rafter vertical angle. It is always somewhat greater than the common rafter vertical angle.

In FIG. 7 corner hip rafter fixture 211 fits between a center hip rafter 114 and a common rafter 115 and it receives corner rafter 214 between flaps 223 and 224 which are connected by strap 217. Flaps 225 and 226 are nailed or otherwise secured to rafters 114 and 115 respectively, while top flanges 235 and 236 rest on and are secured to the top of rafters 114 and 115 respectively.

Comparing fixture 211 of FIG. 7 with fixture 111 of FIG. 6 it will be noted that all three of the rafters 113, 114, and 115 in FIG. 6 are common rafters while in FIG. 7 rafter 214 is an angle rafter while rafters 114 and 115 are common rafters. As in previous figures the other fixtures that are used to join rafters shown in FIG. 7 are omitted with only the above described fixture 211 shown.

Bend lines 227 and 228 in FIG. 7 are vertical and since rafter 214 is an angle rafter the angle A between bend line 227 and bend line 219 will correspond to the angle rafter vertical angle A. For a roof with a 5/12 pitch the vertical angle of an angle rafter is 73.58 degrees. This should be compared with the angle C between bend line 127 and bend line 119 in FIG. 6 which was determined to be 67.38 degrees for a 5/12 pitch roof. One may now consider how the developed view of fixture 211 of FIG. 7 would compare with the developed view of fixture 111 of FIG. 6 in FIG. 14.

Fixture 211 of FIG. 7 is arranged to secure rafter 214 between two other rafters 114, 115 which are at a right angle whereas center rafter fixture 111 secures rafter 114 against a pair of rafters 113 and 115 which are aligned at 180 degrees. This difference in the fixture 211 would not affect the developed view of the fixture because it only influences the angle of the bend along bend lines 227 and 228. In fact the only significant difference in the development of fixture 211 as compared with fixture 111 is the angle C between bend line 119 and bend line 127 (and between bend line 120 and bend line 128). This angle is equal to the vertical angle of the rafter being secured and for fixture 211 would necessarily be the vertical angle A of an angle rafter. As previously mentioned this angle for a 5/12 pitch would be 73.58 degrees for fixture 211 instead of 67.38 degrees for fixture 111.

It may be noted that the angle C between bend line 227 and 237 for fixture 211 is the same as the angle C between bend line 127 and bend line 137 for fixture 111. This correspondence is due to the fact that for each of the fixtures the rafters between which the middle rafter is being secured are common rafters having a vertical angle of 67.38 degrees. In summary then, the developmental view of FIG. 14 could be modified to show the development of fixture 211 of FIG. 7 merely by changing the angle C between bend line 119 and bend line 127 (and also bend line 120 and bend line 128), from the vertical angle C for a common rafter to the vertical angle A for an angle rafter.

The placement and securing of a corner hip rafter 214 through the use of fixture 211 is essentially self-evident. Once the rafters 113, 115, and 114 were secured in place fixture 211 is secured in the right angle junction between rafter 114 and 115 and nailed in place with rafter 214 nailed into fixture 211 between flaps 223 and 224.

The length of rafter 214 is approximately 17/12 times that of rafters 114 and 115 and the bottom end of rafter 214 will be located at the corner of the two exterior walls where the plates join. Rafter 214 may be joined to the top of the plate corner by the use of a fixture 91 by bending up flap 105 or flap 107, or both of them, so that fixture 91 may be located at a 45 degree angle to the two walls.

Figure 8:
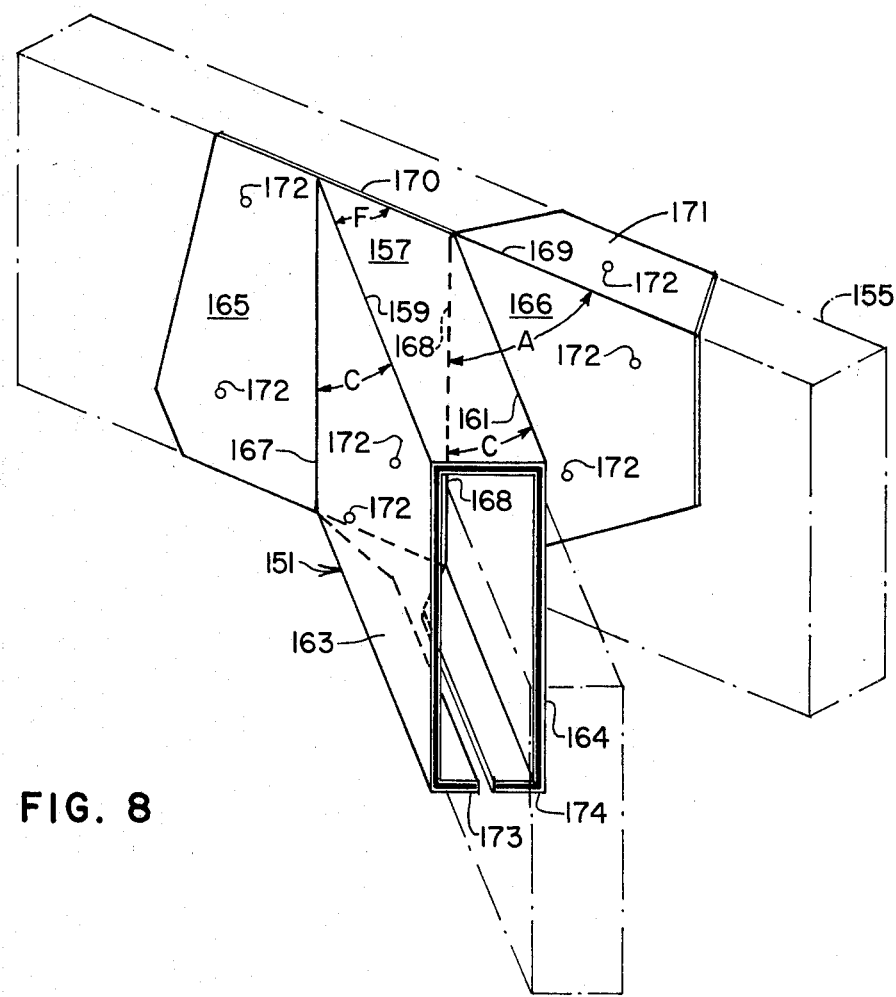
FIG. 8 is an isometric view of a jack rafter fixture according to the invention.

The corner hip rafter 214 forms the support for the jack rafters used on the hip portion of the roof. FIG. 8 shows fixture 151 by means of which the jack rafters are secured to the hip corner rafter. It will be understood that the jack rafter fixture 151 illustrated in FIG. 8 is a left-hand fixture and that a right-hand jack rafter fixture would be provided which is the mirror image of the fixture 151 shown in FIG. 8 and would be used to secure jack rafters from the right side of the corner hip rafter.

Jack rafter fixture 151 is formed of sheet metal and includes a strap portion 157 from which extend flaps 163 and 164 bent along bend lines 159 and 161. Jack rafter 153 fits into the space between flap 163 and flap 164. Bent from flaps 163 and 164 respectively are a small flap 165 and a large flap 166; the bend lines for flaps 165 and 166 are bend lines 167 and 168 respectively. Bend lines 167 and 168 are vertical and thus the angle C between bend line 167 and bend line 159 is the vertical angle C of rafter 153 which is the common rafter vertical angle (for a 5/12 pitch roof this is 67.38 degrees). The same angle C is measured between bend line 161 and bend line 168. Bend line 168 and bend ine 167 are not evenly spaced along strap 157; in other words, flap 163 is larger than flap 164. Consequently the inner edge 170 of strap 157 is at an angle which is determined to place this edge of strap 157 parallel with the vertical face of the hip corner rafter 155. The angle F between this edge of strap 157 and bend line 159 is slightly less than 45 degrees. It is approximately 43 degrees for a 5/12 pitch roof. This angle F when projected onto the horizontal would be 45 degrees. It is determined by projecting a 45 degree angle on the horizontal to the angle of strap 157 which in this case is the angle of a common rafter with the horizontal, namely 90°−67.38°=22.62°. The angle for the end of strap 157 is arrived at by taking the sine of the jack rafter vertical angle and determining the angle for which that is the tangent. For example, for a 5/12 pitch the common rafter vertical angle is 67.38 degrees which has a sine of 0.923 which is the tangent of 42.7 degrees.

In accordance with the previously described development of fixture 151 flaps 165 and 166 will be parallel to the vertical face of corner hip rafter 155 when they are bent along bend lines 167 and 168 to align with the angled edge 170 of strap 157.

Flap 166 is provided with a flange 171 which is bent along bend line 169. Bend line 169 intersects the junction of bend line 168 and the angled edge 170 of strap 157; the angle A between bend line 169 and vertical bend line 168 is equal to the vertical angle of corner hip rafter 155 (in the case of a 5/12 pitch 73.58 degrees). Flange 171 is bent at a right angle to flap 166 and thereby fits on the top edge of rafter 155. Fixture 151 is secured as explained in connection with the other fixtures by nails driven through the sheet metal into rafters 153 and 155 and guide holes 172 for the nails may be provided in appropriate places in flaps 163, 164, 165 and 166 and in flange 171. A flange might also be provided for strap 165 corresponding to strap 171 for flap 166 but this is not necessary and it has been omitted in FIG. 8. Instead flap 165 is cut along the line extending from the angled edge 170 of strap 157. As in the case of previously described fixtures flanges 173 and 174 may optionally be provided at the bottom of flaps 163 and 164. It will be understood that a properly constructed roof will have another jack rafter joined to corner hip rafter 155 in the same location as jack rafter 153 but on the opposite side of rafter 155. It will require a right-hand jack rafter fixture developed from a mirror image of the developed view shown in FIG. 15.

Figure 15:
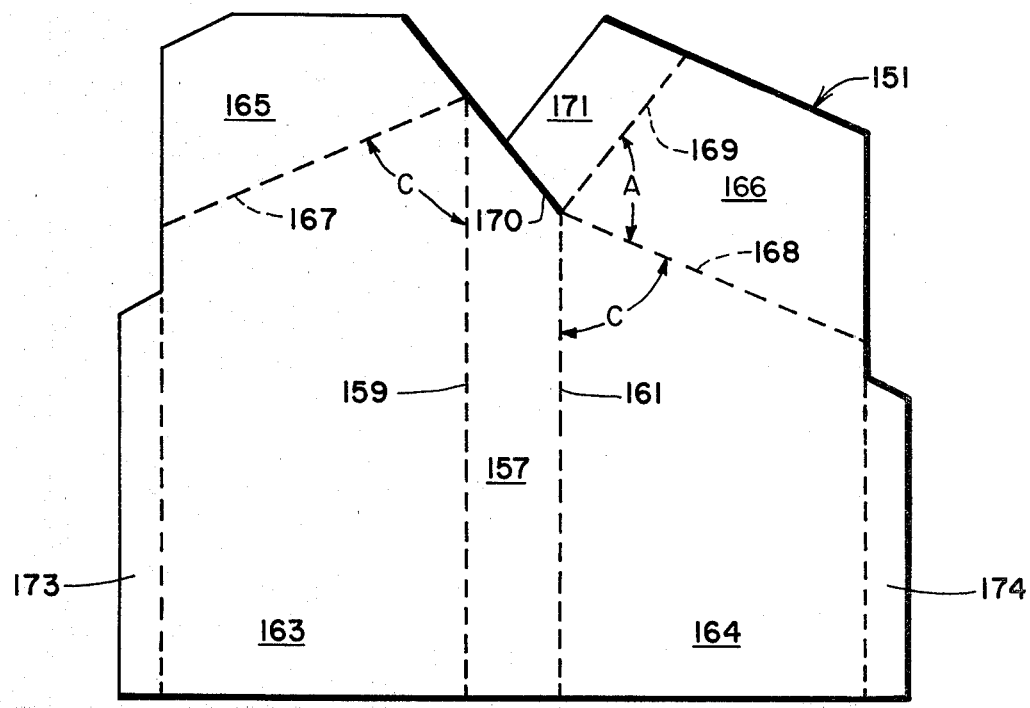
FIG. 15 is a developed view of the device of FIG. 8.

The developed view of FIG. 15 is generally self-explanatory. It should be appreciated that generally the size and external shape of the flaps and flanges in FIG. 15 is not critical; however, the location and angles for the bend lines is quite important. It may be noted that the angled edge 170 of strap 157 is formed by a cut which leaves as much material for flange 171 as is available. However, this is not an essential feature of the configuration and numerous other modifications in the developed layout could be made within the spirit of the invention.

It will be understood in accordance with the principles of roof framing already described that fixture 151 should be adaptable to join a jack rafter with a valley rafter, since a valley rafter is also an angle rafter and is essentially the inverted form of a hip rafter. Put in other terms, the angular relations in the junction of a jack rafter to a valley rafter are essentially the same as in the junction of a jack rafter to a corner hip rafter except that the jack rafter extends upwardly from the valley rafter rather than downwardly. In fact the jack rafter fixture of FIG. 8 is adapted to join jack rafters and valley rafters by the simple expedient of inverting it so that the strap 157 is on the bottom of the jack rafter (and slopes upwardly). Using fixture 151 for both hips and valleys is obviously advantageous in order to reduce the number of different types of fixtures required for a complicated roof structure. It should be noted however that the design of fixture 151 could be modified by reversing the location of strap 157 with that of flanges 173, 174 thereby providing a fixture which would have the strap on top when utilized for joining jack rafters to valley rafters. The manner of joining jack rafters to valley rafters essentially corresponds to that described with reference to using fixture 151 with hip rafters and will not be explained in further detail.

One aspect of construction of valleys for pitched roofs does, however, require further explanation. Frequently a valley in a roof will not extend to the peak of the roof; rather a right valley and a left valley will join and disappear short of the peak of the roof. This construction requires that a pair of valley rafters join a common rafter or jack rafter extending down from the peak of the roof. In accordance with the invention a fixture may readily be provided to join each of a pair of valley rafters to a jack rafter extending down from the peak of the roof. As expected a right-hand fixture and a left-hand fixture are required. These fixtures might be referred to as "valley fixtures". It turns out that they are essentially similar to jack rafter fixture 151 and accordingly will be described with reference to FIGS. 8 and 15. It may be mentioned that in some cases a valley rafter may be diametrically opposite a hip rafter, both of which extend to the peak of the roof. In such cases a common rafter fixture 11 may be used to join these two rafters. The adjustment of the common rafter fixture would take into account the fact that two angle rafters are being joined rather than two common rafters. In other cases a pair of valley rafters may join at the peak of a roof. In such case a short stub of a jack rafter may conveniently be provided to which the valley rafters are attached. In every case the junction of a pair of valley rafters should be provided with an opposing common rafter on the opposite side of the roof.

A valley rafter fixture will have the same general appearance as the jack rafter fixture illustrated in FIG. 8. The difference in the valley rafter fixture is that the rafter in the position of rafter 153 would be a valley rafter whereas the rafter in the position of rafter 155 would be a jack rafter and would normally be cut off at the end of flap 166. Of course another valley rafter would be joined on the other side of rafter 155.

The development of a valley rafter would be slightly different from the development of the jack rafter shown in FIG. 8. This difference is similar to the difference previously explained between the development for the center hip rafter fixture and the development for the corner hip rafter fixture. In FIG. 8 rafter 153 is a common rafter and rafter 155 is an angle rafter. Just the opposite would be true in the case of a valley rafter fixture. Therefore, the valley rafter fixture would differ in that the angle between bend line 161 and bend line 168 would be the angle rafter vertical angle (this same relation would apply to lines 159 and 167) while the angle between the bend line 168 and the bend line 169 would be the common rafter vertical angle.

The angle edge 170 of the valley rafter fixture would be at an angle equal to the projection of a 45 degree angle in the horizontal to the angle rafter angle (rather than the common rafter angle as in FIG. 8).

Due to the similarity of the appearance of the valley rafter fixture and the jack rafter fixture it would be desirable to mark those fixtures and also the center hip rafter and the corner hip rafter fixture to show whether a common rafter or an angle rafter is to be placed in each respective position of the fixture. Of course, the fixtures will also be marked with the roof pitch for which they are configured.

With the fixtures described a pitched roof of simple or complex structure can be assembled with the minimum of computation, accurate measurement, or angle determination and cutting. A noteworthy feature of roof construction according to the invention is that ridge boards are generally not required for the roofs. While a ridge board is almost always utilized in conventional roof construction, upon reflection it is found to be quite unnecessary in roof construction according to the present invention. A principal purpose of the ridge board is to provide a way to nail the peak end of a rafter in place without making a difficult toe-to-toe joint with an opposing rafter. The common rafter fixture very conveniently joins the peak ends of opposing rafters and eliminates this purpose for the ridge board. The ridge board serves to space the rafters by the prescribed distance but once the sheathing is in place this becomes a redundant function of the ridge board. In construction according to the invention a temporary ridge board may be nailed near the peak of the rafters if this will make the construction more convenient, but this is not a necessary procedure in most instances.

The manner of aligning the roof and particularly the peak of the roof is not really rendered any simpler by the ridge board. In any event the peak of the roof can be quite easily and accurately aligned in the present construction by rigging a line to mark the roof peak and adjusting each pair of rafters to touch the line.

The application of roof sheathing will proceed in accordance with conventional roof construction techniques once all the rafters are positioned and fastened in accordance with the system of the invention. If a situation should arise in roof construction where a ridge board is really necessary the use of a ridge board may be accommodated by using the center hip rafter fixture of FIG. 6 to secure common rafters to the ridge board by bending up or removing flanges 135 and 136. In general, however, the use of a ridge board is to be avoided, and it is considered very doubtful that a situation would arise in which construction would not proceed more effectively with use of only a temporary ridge board at most.

Figure 9:
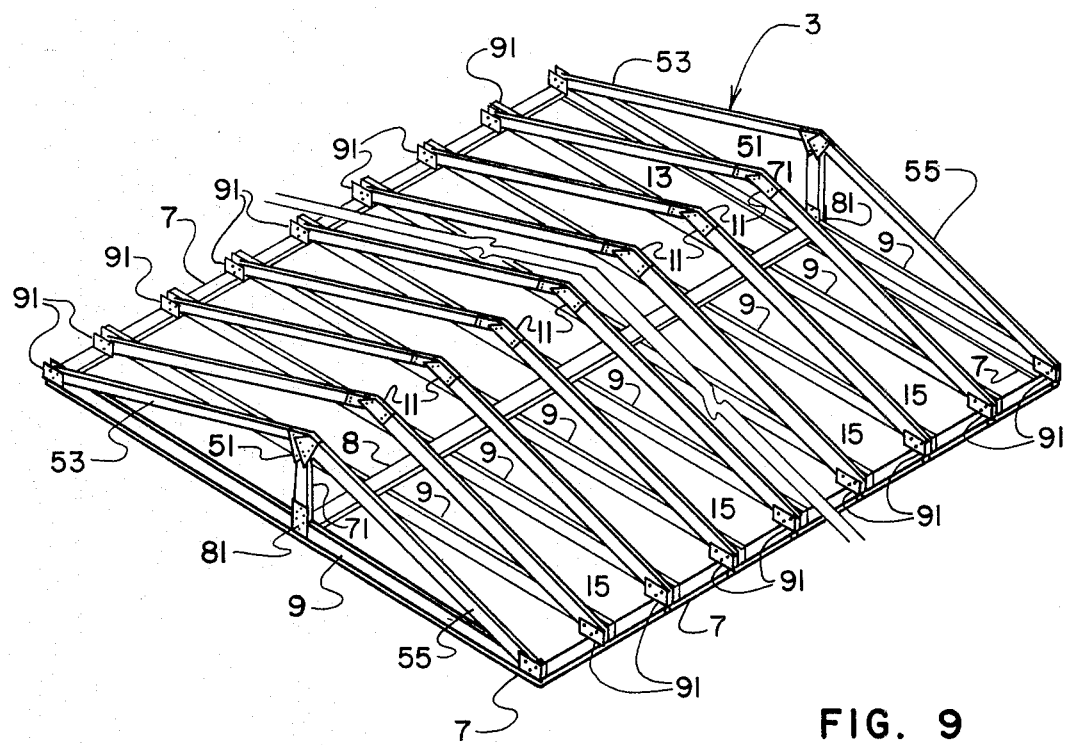
FIG. 9 is an isometric view of a portion of a gabled (saddle) roof constructed according to the invention.

A gabled roof with rafters assembled in accordance with the invention is shown in FIG. 9. The plates surmounting the exterior walls are shown at 7; the exterior walls are not shown. A plate of an interior wall is shown at 8. Ceiling joists 9 are secured in any suitable fashion to the top of plates 7 and 8.

The joists 9 are shown as being on two foot centers but they may equally well be on 16 inch centers since they may be independently secured to the plates by the use of fixtures 91 or otherwise. When the joists 9 are on two foot centers and located adjacent rafters 13 and 15 it is convenient to secure the joists and rafters together. Rafters 13 and 15 are joined together at the roof peak with fixtures 11 and are secured at their lower ends to plates 7 by fixtures 91.

End rafters 53 and 55 are secured together at the roof peak by fixture 51 which also is utilized to secure a vertical support or king post 71 to the junction of rafters 53 and 55. Fixture 81 secures the bottom of king post 71 to a joist 9 or alternatively directly to plate 7. The rafters for the roof structure 3 of FIG. 9 do not extend beyond plates 7 as they would if the roof 3 were to be constructed with an overhang. The rafters may be cut the proper length prior to being put in place or may be cut off after being in place (particularly in the case of a roof with an overhang).

Figure 10:
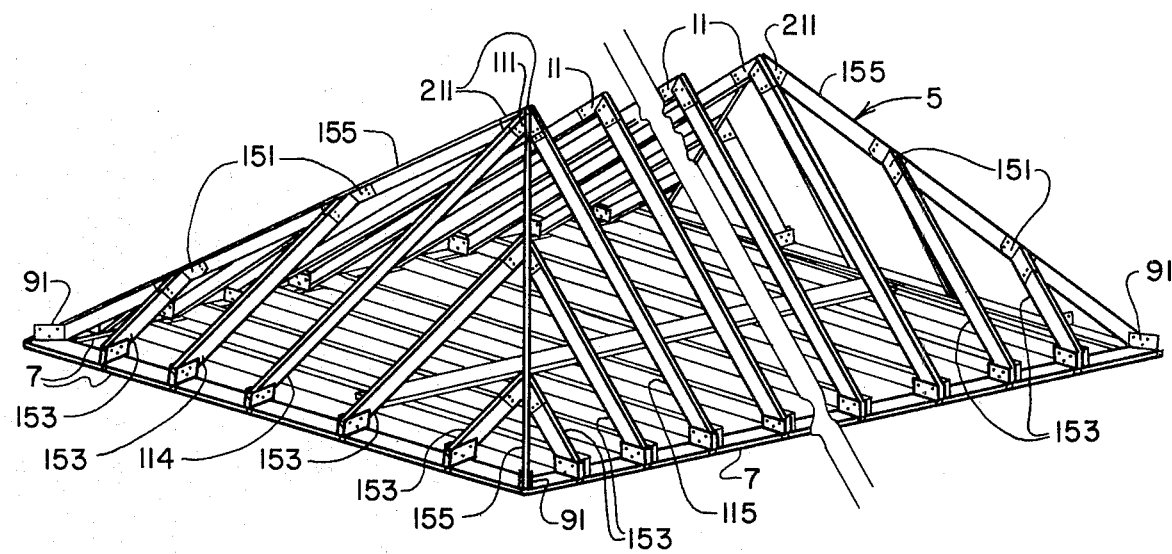
FIG. 10 is an isometric view of a portion of a hip roof according to the invention.

FIG. 10 shows a hip roof rafter assembly according to the invention. A narrow roof is shown for illustration but it will be understood that the same construction may be employed for a much larger roof. The plates and joists of FIG. 10 are similar to those shown in FIG. 9 and the center rafters are arranged similarly to those of FIG. 9 (the pitch of roof structure 5 in FIG. 10 is greater than that shown in FIG. 9). The ends of the roof structure 5 are formed by center rafters 114 secured at the top end by fixtures 111 to the junction of two common rafters 13 and 15 in a fixture 11. Corner hip rafters 155 are secured at the top between rafter 114 and rafters 113 or 115. Jack rafters 153 are joined in pairs to corner hip rafter 155 by fixtures 151 to fill out the hip portion of the roof.

From the foregoing description it will be seen that a complete system has been described including fixtures necessary for use as common rafter fixtures, center hip rafter fixtures, corner hip rafter fixtures, jack rafter fixtures, and valley rafter fixtures. The fixtures have been described in detail with reference to a system for a 5/12 pitch roof. Furthermore, from the explanation the different angles for roofs of different pitch may be determined from standard trigonometry tables. As a further example the angles for a 3/12 pitch roof are common rafter vertical angle 75.96 degrees, angle rafter vertical angle 79.98 degrees, jack rafter projected 45 degree angle 44.13 degrees, and valley rafter projected 45 degree angle 44.56 degrees. These angles for a 9/12 pitch roof are common rafter vertical angle 53.13 degrees, angle rafter vertical angle 62.06 degrees, jack rafter 45 degree projected angle 38.66 degrees, and valley rafter 45 degree projected angle 41.46 degrees.

Numerous variations in the fixtures and the system may be made within the scope of the invention. For example, while sheet metal is well suited as the material for forming the fixtures they may be formed of any material having appropriate physical properties. Also while the box or channel structure employed in the shape of the fixtures is advantageous for achieving great strength with lightweight material it will be appreciated that an important feature of the fixtures is the proper arrangement of the angled faces of the fixture to guide and secure the rafters into the proper relationship; the box or channel structure is not essential to this feature.

In addition to the variations and modifications to the invention suggested and described other modifications and variations will be apparent to those skilled in the art, and accordingly the scope of the invention is not to be considered limited to the particular embodiments shown, described or suggested but is rather to be determined by reference to the appended claims.

What is claimed is:

1. In a pitched roof structure a fixture for joining a pair of rafters at the peak of a roof comprising
    a top strap element having a transverse bend in the central portion thereof,
    at least one first flap extending down from the side of one end of said strap and adapted to be fastened to the side of a first wood rafter, and
    at least one second flap extending down from the side of the other end of said strap and adapted to be fastened to the side of a second wood rafter, an extension of said first flap overlapping said second flap,
    said fixture being formed of one piece of sheet metal.

2. In a pitched roof structure a fixture for joining a pair of rafters at the peak of a roof comprising
    a top strap element having a transverse bend in the central portion thereof,
    at least one first flap extending down from the side of one end of said strap and adapted to be fastened to the side of a first wood rafter, and
    at least one second flap extending down from the same side of the other end of said strap and adapted to be fastened to the side of a second wood rafter, an extension of said first flap overlapping said second flap,
    said second flap and said extension each having at least one index mark placed so that a mark on said flap aligns with a mark on said extension for a bend producing a predetermined angle between the portion of said strap on either side of said bend,
    said fixture being formed of one piece of sheet metal.

3. In a pitched roof structure a fixture for joining a pair of rafters at the peak of a roof comprising
    a top strap element having a transverse bend in the central portion thereof,
    a first pair of flaps extending down from respective sides of one end of said strap and adapted to be fastened to the sides of a first wood rafter, and
    a second pair of flaps extending down from the respective sides of the other end of said strap and adapted to be fastened to the sides of a second wood rafter, an extension of each of said first pair of flaps overlapping a corresponding one of said second pair of flaps,
    said fixture being formed of one piece of sheet metal.

4. In a pitched roof structure, including common rafters disposed at a common rafter vertical angle and angle rafters disposed at an angle rafter vertical angle, a fixture for joining a first rafter and at least one other rafter at a compound angle comprising
    a top strap element,
    a first flap and a second flap extending down from said strap at a right angle thereto and having bend junction lines with said strap which are parallel to each other and separated by about the thickness of one of said rafters,
    a third flap bent from said first flap along a vertical bend line which extends at an acute angle with said bend junction line equal to a first predetermined angle,
    a flange bent from said third flap along a bend line extending at an acute angle to said vertical bend line equal to a second predetermined angle, and
    a fourth flap bent from said second flap along a vertical bend line which extends at an angle with said bend junction line equal to said first predetermined angle and is offset along the length of said strap relative to the vertical bend line for said third flap.

5. In a pitched roof structure, including common rafters disposed at a common rafter vertical angle and angle rafters disposed at an angle rafter vertical angle, a fixture for joining a first rafter and at least one other rafter at a compound angle comprising
    a top strap element,
    a first flap and a second flap extending down from said strap at a right angle thereto and having bend junction lines with said strap which are parallel to each other, a third flap bent from said first flap along a vertical bend line which extends at an acute angle with said bend junction line equal to a first predetermined angle, and a flange bent from said third flap along a bend line extending at an acute angle to said vertical bend line equal to a second predetermined angle.

6. Apparatus as recited in claim 5 wherein said first predetermined angle is equal to said second predetermined angle.

7. Apparatus as recited in claim 5 wherein said first predetermined angle is said angle rafter vertical angle and said second predetermined angle is said common rafter vertical angle.

8. Apparatus as recited in claim 5 wherein said bend junction lines are separated by about the thickness of one of said rafters.

9. Apparatus as recited in claim 8 wherein said first predetermined angle is said common vertical rafter angle.

10. Apparatus as recited in claim 8 wherein said first predetermined angle is said angle rafter vertical angle.

11. Apparatus as recited in claim 8 wherein said first predetermined angle is said common rafter vertical angle and said second predetermined angle is said angle rafter vertical angle.

12. Apparatus as recited in claim 8 further including a fourth flap bent from said second flap along a vertical bend line which extends at an angle with said bend junction line equal to said first predetermined angle.

13. Apparatus as recited in claim 8 further including a fourth flap bent from said second flap along a vertical bend line which extends at an angle with said bend junction line equal to said first predetermined angle, and a flange bent from said fourth flap along a bend line extending at an angle to said vertical bend line equal to said second predetermined angle.

14. Apparatus as recited in claim 13 wherein said first predetermined angle is said common rafter angle.

15. Apparatus as recited in claim 13 wherein said first predetermined angle is said angle rafter angle and said second predetermined angle is said common rafter angle.

* * * * *